United States Patent [19]

Sanchez et al.

[11] Patent Number: 5,784,556
[45] Date of Patent: Jul. 21, 1998

[54] ANALYZER USING CONTROL GRAPH FOR SYSTEM CALL FUNCTION AND LISTS OF LOCK APPLICATIONS FOR ALL POSSIBLE SYNCHRONIZATIONS OF PROCESSES TO ANALYZE RISKS OF BLOCKING OPERATION

[75] Inventors: Michel Sanchez, Voiron; Frédéric Brugnot, Eybens; Michel Chervier, Grenoble, all of France

[73] Assignee: Bull S.A., Louveciennes, France

[21] Appl. No.: 423,631

[22] Filed: Apr. 17, 1995

[30] Foreign Application Priority Data

Apr. 18, 1994 [FR] France .................. 94 04578

[51] Int. Cl.$^6$ .................................................. G06F 9/00
[52] U.S. Cl. .................. 395/200.08; 395/200.19
[58] Field of Search ........................ 364/200, 300; 370/85.4; 395/375, 650, 200.08, 200.19

[56] References Cited

U.S. PATENT DOCUMENTS

| | | | |
|---|---|---|---|
| 4,189,771 | 2/1980 | Roever | 364/300 |
| 4,791,554 | 12/1988 | Hirota et al. | 364/200 |
| 5,283,896 | 2/1994 | Temmyo et al. | 395/650 |
| 5,297,150 | 3/1994 | Clark . | |
| 5,442,763 | 8/1995 | Bartfai et al. | 395/375 |
| 5,459,871 | 10/1995 | Van Den Berg | 395/650 |
| 5,491,694 | 2/1996 | Oliver et al. | 370/85.4 |

FOREIGN PATENT DOCUMENTS 0430182  5/1991  European Pat. Off. .

OTHER PUBLICATIONS

IBM Technical Disclosure Bulletin, vol. 34, No. 5, Oct. 1991, New York US, pp. 84–89 "Extraction and hierarchical reporting of program linkage relationships" * p. 88, line 16–line 19*.

Computer Systems, vol. 9, No. 5, May 1989, Bromley GB pp. 37–38 "Kenneth Dakin Intelligent testing" *p. 37, right col., line 2–line 15*.

Primary Examiner—Christopher B. Shin
Assistant Examiner—David Ton
Attorney, Agent, or Firm—Edward J. Kondracki; Kerkam, Stowell, Kondracki & Clarke, P.C.

[57] ABSTRACT

The invention relates to a static analyzer of the risks of blocking the operation of a system. The analyzer produces lists of lock applications associated with allocations of the resources of the system which conform to Coffman conditions. The analyzer also produces the names of the source programs from which the lists are extracted. This allows the constructor of the system to modify his source programs in order to eliminate the risks of deadlocking between different processes in the system. The constructor of the system will thus be assured that no allocation of resources will have a blocking effect, no matter what the synchronizations of the various processes being executed in the system may be.

13 Claims, 5 Drawing Sheets

ANALYZER USING CONTROL GRAPH FOR SYSTEM CALL FUNCTION AND LISTS OF LOCK APPLICATIONS FOR ALL POSSIBLE SYNCHRONIZATIONS OF PROCESSES TO ANALYZE RISKS OF BLOCKING OPERATION

The disclosed invention relates to the detection of deadlocks in multiprocessor systems with shared memory.

BACKGROUND OF THE INVENTION

A set of processes is deadlocked if each process in the set is waiting for an event which can only be caused by another process in the set. For a given process, a typical event is the takeover of a resource (printer, memory, etc.) being used by another process.

The risks of deadlocks are more numerous in multiprocessor architecture than in single-processor architecture, by reason of the increased number of processes executed in parallel which call the same resources.

DESCRIPTION OF THE RELATED ART

Means for the prevention of deadlocking are known in the prior art. Among these is the constitution of a pre-established hierarchical order for the allocation of resources. Adhering to this order in the calling of these resources eliminates the risks of deadlocking. Unfortunately, a pre-established order is not always adapted to the needs of the system.

Methods based on the observation of the program are known in the prior art.

Pieces of information are collected throughout the execution of the program, then presented to the user.

The pieces of information, such as those which relate to requests for and releases of resources, allow the causes of deadlocking to be found. However, the detection of the errors and the analysis of the behavior are made by the user visually, a posteriori, without any interaction with the program.

Another method consists of saving the global state of the program at certain points in its execution; the current state of the program is saved on a disk in the form of execution snapshots.

Another method used consists of finding the cause of the deadlock by analyzing the registers of the stacks for the execution of the process at the moment of the deadlock.

Interactive methods for the execution of a program are also known in the prior art.

Interaction makes it possible, for example, to place breakpoints in the program, and to check the state of a process or the contents of the variables. This method is generally complementary to the method of observing the program after the collection of pieces of information throughout the execution. Observation allows a first approach to the problem which is often completed by a re-execution of the program with additional interaction in order to find the exact causes of the deadlock.

Methods which use detection followed by recovery are also known in the prior art.

The detection and recovery methods ensure that the system detects a deadlock if one occurs, and then tries to find a solution for breaking out of the deadlock. This technique, then, requires two steps, the detection of the deadlock, then the recovery, which must bring the system to a state in which the process is unblocked.

If all the resources of the system are different, a request to one type of resource can only be satisfied by a single resource. If some of the resources are identical, any one of these resources can be used to respond to a request to this type of resource.

One method known in the prior art consists of recovery by deallocation of resources.

While recovery by deallocation of resources poses no problem in the case of preemptible resources, it is very difficult and often impossible with non-preemptible resources. This operation often requires human intervention. Take, for example, the deallocation of a laser printer resource: the user, after having been informed of a deadlocking problem, will have to cancel the print jobs already executed by the current process. This process will be interrupted, relinquishing the printer resource to a second process in the wait state, or queue. When the second process releases the printer resource, the interrupted process will resume its execution.

Another known method is that of recovery by process destruction.

The crudest way to break the deadlock cycle is to kill one or, if necessary, several of the deadlocked processes.

It may also be of interest to kill a process which is not in the cycle but which is detaining the resources for which the deadlocked processes are waiting. For example, if a first process has possession of a printer resource and is waiting for a plotting table, and a second process has possession of a plotting table resource and is waiting for a printer, this is a deadlock situation. If the system has a third, less important process which is detaining these two resources, it may be of interest to kill it in order to release the other two.

Insofar as possible, it is preferable to destroy the processes whose destruction cost is lowest; the cost criterion remains to be defined. The processes most suitable for destruction can be, for example, the processes whose re-execution from the start causes no harm, such as the compilation of a program which does nothing more than read a source file and produce an object file. This compilation can be interrupted and resumed from the start without damage, since the first execution has no influence on the second execution.

A final known recovery method is that which consists of a return to a prior state.

This method is not without danger; in fact, the destroyed processes may have left data in an incoherent state. Another method consists of periodically backing up the state of the processes while defining resumption points which correspond to states deemed significant. In order to effect a recovery following the detection of a deadlock, a process which is detaining the resources for which the deadlocked processes are waiting is re-executed from a resumption point which precedes the obtainment of these resources. All the operations effected by this process after the resumption point of the execution are lost and the resources of this process are released. Thus, the deadlocked processes will be able to obtain their resources, and the partially re-executed process will be placed in a wait state when it requests the resources it has lost.

The methods cited do not provide a completely satisfactory answer to the deadlock problem. That is why the invention proposes a process for the preventative handling of source files which prevents the appearance of deadlocks in the execution of processes.

It is known from E. G. Coffman et al, in "System deadlocks," ACM Computing Surveys, Vol. 3, June 1971, pages 67 through 78, that four conditions are necessary and sufficient to cause a deadlock. The first condition is that the resources be used mutually exclusively. The second condition is that each process uses several resources simultaneously, and acquires each resource in accordance with its needs, without releasing those it already has in its possession. The third condition is that the allocations of resources have a blocking effect due to applications of locks, and that the resources not be able to be requisitioned, that is, that they be non-preemptible. The fourth condition is that there is a sequence of processes p0 through pn, so that each process waits for a resource being used by the next one, and the last process waits for a resource being used by the first one.

SUMMARY OF THE INVENTION

The invention applies, preferably but not exclusively, to systems in which the allocations of resources comply with the first three conditions of Coffman et al., and in which it is desired that the fourth condition never be fulfilled.

The invention relates to a static analyzer of the risks of blocking the operation of a system.

This analyzer produces the lists of lock applications associated with allocations of resources in the system which comply with the Coffman conditions. This analyzer also produces the name of the source programs from which these lists are extracted. This allows the manufacturer of the system to modify its source programs in order to eliminate the risks of deadlocking between the different processes in the system. The manufacturer of the system is thus assured that no allocation of resources will have a blocking effect, no matter what the synchronizations of the various processes being executed in the system may be.

A first object of the invention is to eliminate the risks of deadlocking between different processes in a system from the design of this system by allowing the maximum possible freedom in this design. Specifically, greater flexibility is offered in the design of a system if the lock hierarchies, rather than being fixed a priori in a constraining way, can be considered according to the actual needs for the allocations of resources in this system. This is achieved by means of a tool for statically analyzing the risks of blocking the operation of a system, which receives as input the programming files of this system and the nomenclature of the primitive functions for applying and releasing locks in this same system, and produces messages which make it possible to eliminate the risks of deadlocking before this system is started up. This analyzer is characterized in that it includes a first tool which produces a control graph for each system call function contained in the programming files, the steps of this control graph including only the primitive functions of the nomenclature using the resources of the system, and a second tool which generates the lists of lock applications for all of the possible synchronizations of the different processes in the system.

Each takeover of a resource by a process at an instant t corresponds to a lock application which inhibits the other processes from taking over this resource. Therefore, in constituting the lists of lock applications as coded, it is necessary that the set of these lists verify an order relation. After all the lists have been obtained, it is possible, by linking them to one another through their common locks, to detect cycles. A list looped in a cycle cannot verify an order relation. One drawback of multiprocessor architectures lies in the apprehension of the sequencing of different processes as a whole or as independent parts.

A second object of the invention is to make it possible to consider the most unfavorable case, in which all the instructions are executed in parallel. This idea is particularly adapted to the UNIX nucleus. A simulation of a parallel execution of all the instructions is produced due to the fact that the second tool uses a path algorithm for transversal the graphs produced by the first tool, this algorithm calling a recursive "Path" function which is applied to at least two parameters, the current node of the graph being traversed, and the list LM of the locks applied and not released for the nodes of the graph traversed previously, and due to the fact that, each time a node containing a lock release is encountered, the list LM as it existed before this node was encountered is stored in a frozen list LF.

The complexity of the system with the design to which the static analyzer according to the invention is applied is such that the time necessary for the obtainment of results runs the risk of being unacceptably long. But with the use of this static analyzer, the inventors observed a redundancy in the results produced which correlated with the increase in the length of time necessary for their obtainment.

A third object of the invention is to reduce the time necessary for the obtainment of results by eliminating their redundancies along with the causes for their appearances. This is achieved due to the fact that each node NJ of the graph contains the storage of all the different lists LM generated by the "Path" function in the preceding passes through this node, and due to the fact that the "Path" function effects a return of recursivity if the current list LM is the same as one of the stored lists LM.

A fourth object of the invention is to procure a means for avoiding noises in the results furnished by the static analyzer. A noise is constituted by the detection of an error where there is none. This is done in the cycle detection function by means of:

- a step which defines a node NF as the first one addressed by the reciprocal pointer DF contained in the node NO,
- a first loop which masks all the successors of the node NF in the same list, before the recursive call of the function for the successor of the node NO,
- a second loop which unmasks all the successors of the node NF in the same list, after the recursive call of the function for the successor of the node NO,
- a step for the recursive call of the function for the node NF.

BRIEF DESCRIPTION OF THE DRAWINGS

Further characteristics and advantages of the present invention, particularly the details of execution by means of algorithms, will become more apparent from the ensuing description, made in reference to the appended drawings, in which.

The appendix presents the Path algorithm which allows the creation of lists of lock applications.

DESCRIPTION OF THE PREFERRED EMBODIMENTS

An information system is equipped with instructions which allow the processing of the pieces of information which are entered into it. These instructions are first programmed in high-level language, according to the rules of the prior art. The contents of the programs thus developed are available in source files from which a compiler generates sequences in machine language, which are directly executable by the various elements of the system.

Figure 1:
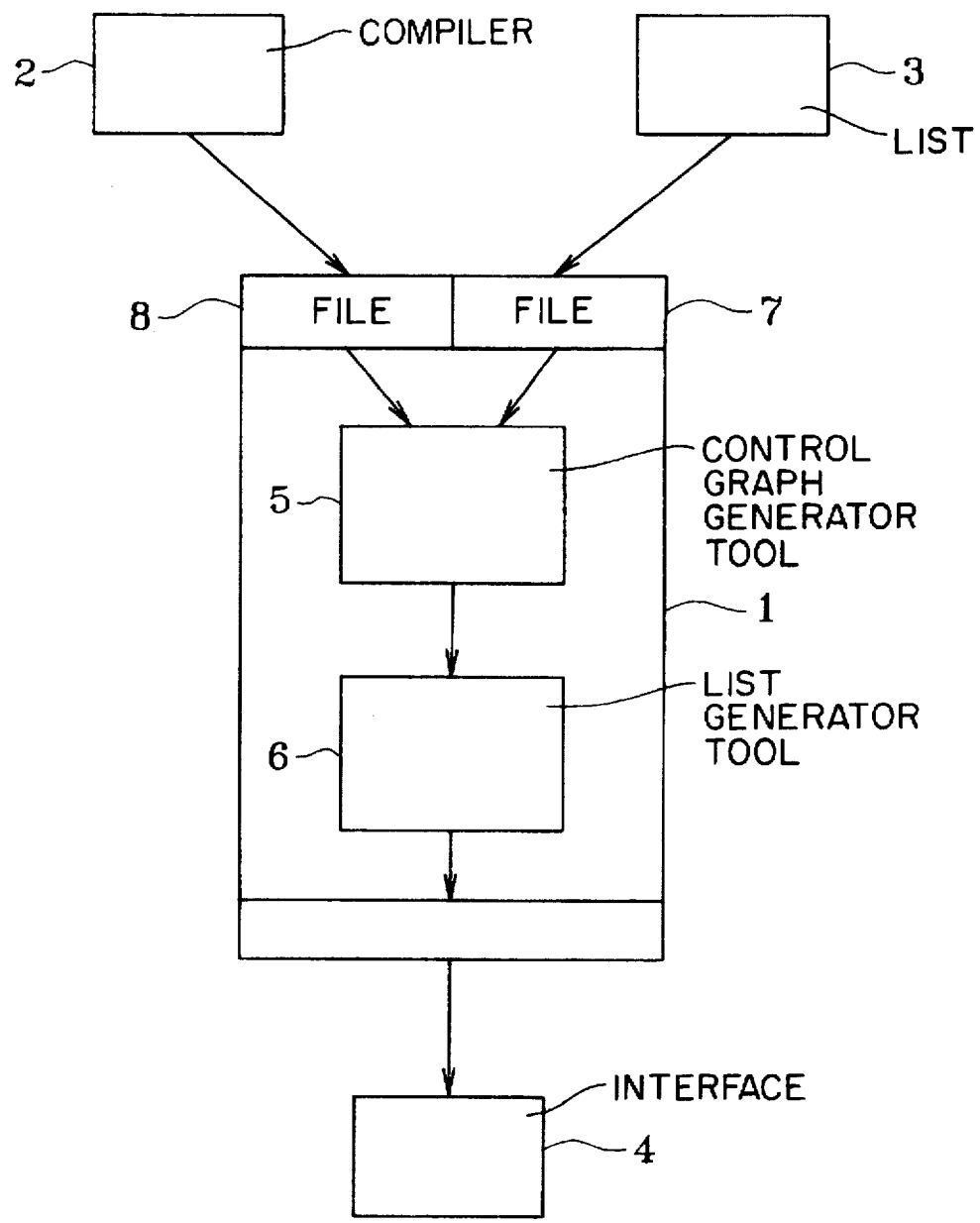
FIG. 1 represents the architecture of a static analyzer according to the invention.
Figure 2:
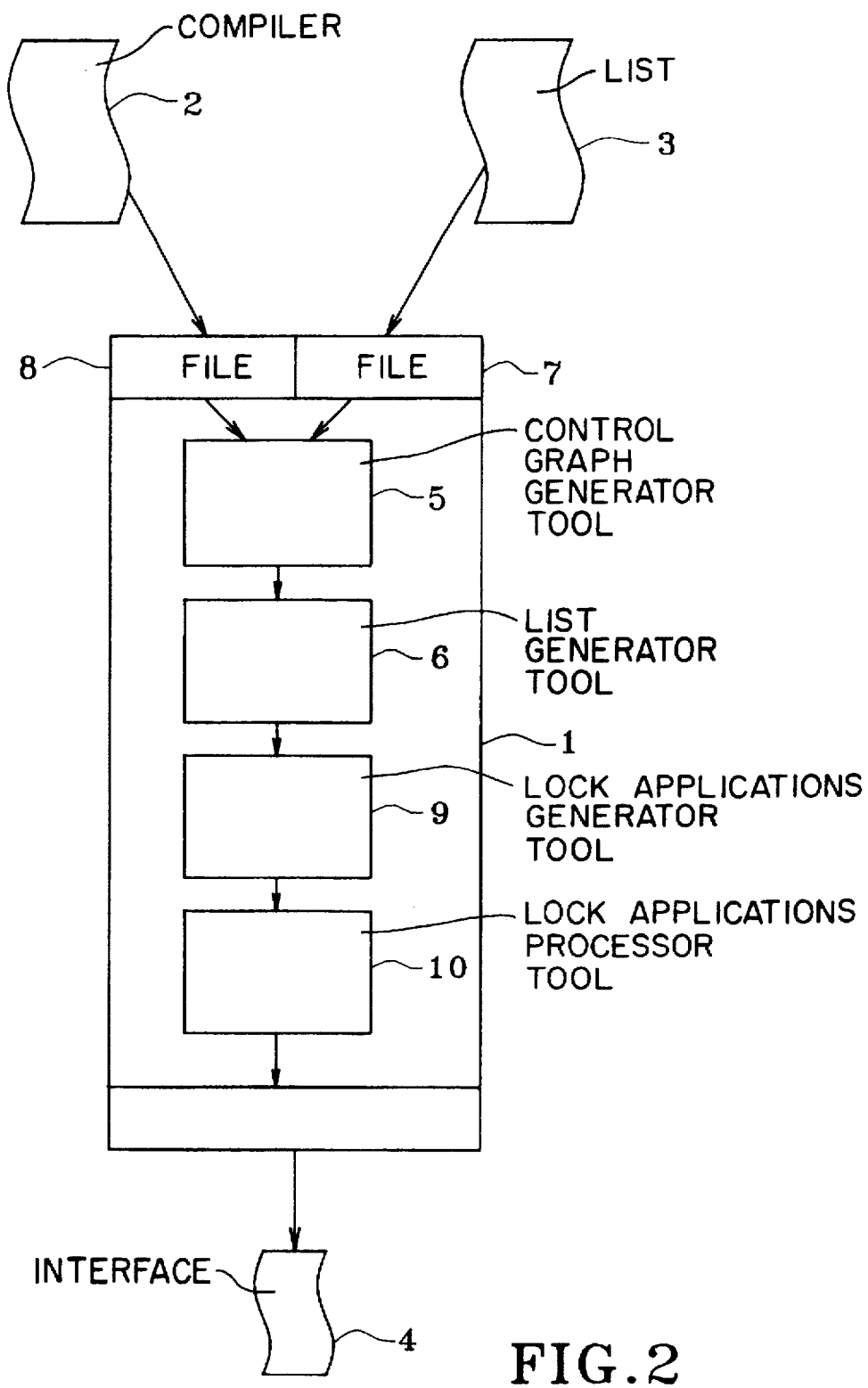
FIG. 2 represents the architecture of an analyzer using supplementary characteristics of the invention.

FIG. 1 represents the general architecture of a static analyzer according to the invention. In this example, the static analyzer (1) which is the subject of the invention is used in a computer. On one hand, in a file (8), it has control trees for each of the primitive functions contained in the source files to be processed. The obtainment of these control trees from the source files poses no difficulty to one skilled in the art. For example, it is possible for one skilled in the art to use the compilation tool (2) adapted to the language in which the source files are written. On the other hand, in a file (7) of the list (3), the analyzer has lock applications which are assigned to the resources of the system, along with the name of each of these lock applications and its syntactical links within the programming language.

The static analyzer (1) essentially includes four tools (5, 6, 9, 10). The function of the tool (5) is to generate a control graph from the elements contained in the files (7) and (8). The function of the tool (6) is to generate a set of lists of lock applications from the control graph furnished by the tool (5). The function of the tool (9) is to generate a graph of lock applications from the lists of lock applications generated by the tool (5). The function of the tool (10) is to process the graph of lock applications generated by the tool (9) in order to indicate the possible lock application sequences which do not verify an order relation. These sequences, if they exist, are edited by an interface means (4) so that they can be used to modify the source programs processed by the tool (1) in order to prevent any deadlock between the processes which will be calling the functions coded by these source programs.

The means used by these different tools, as well as how these means work to obtain the desired result, will now be described in further detail.

Figure 3:
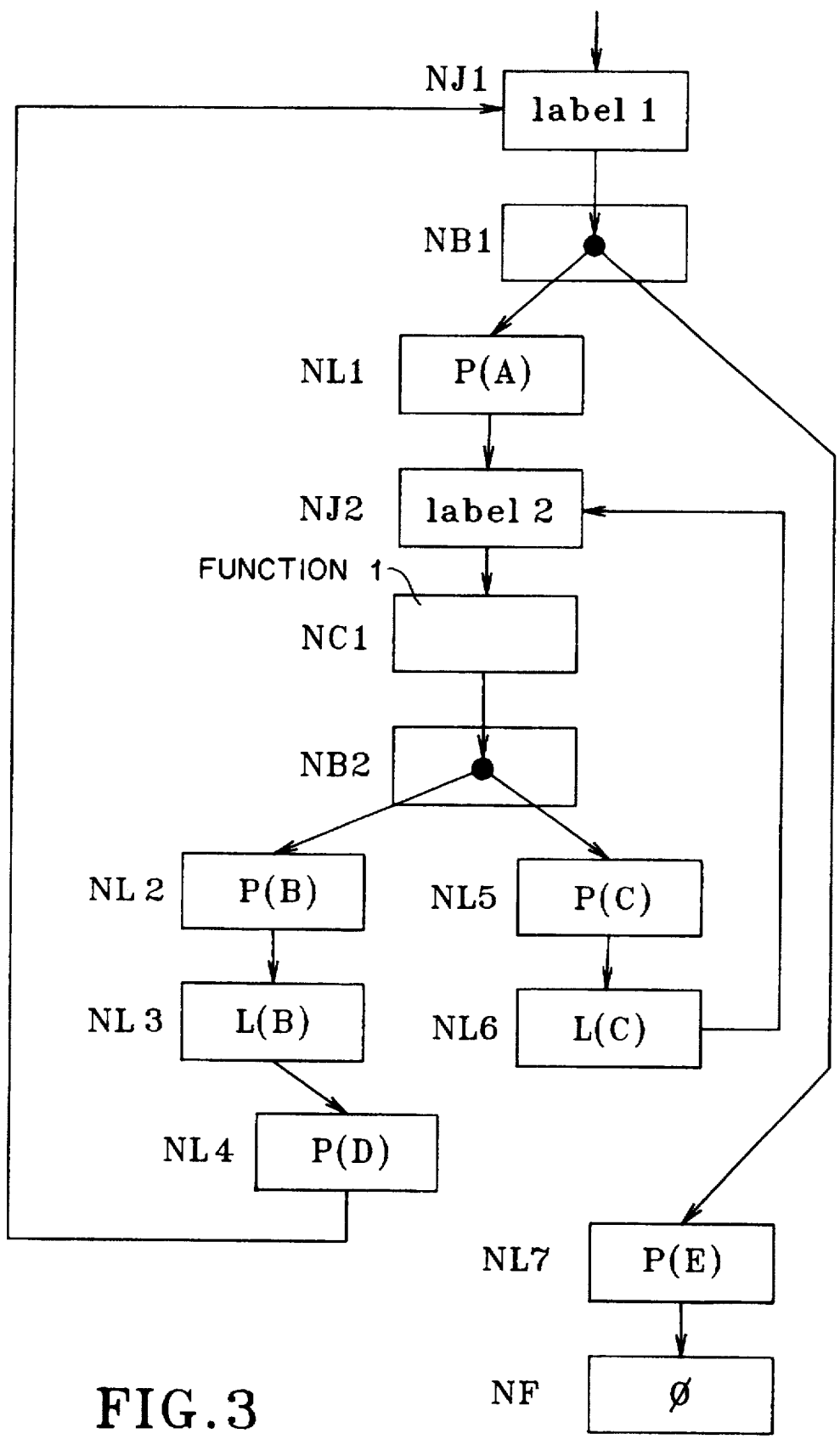
FIGS. 3 and 4 represent symbolic examples of possible intermediate results of the invention.

An example of a control graph generated by the tool (5) is given in FIG. 3. The structure of a control tree like that contained in the file (8) is known to one skilled in the art. Such a tree is constituted by nodes, by branches which originate from these nodes, and by leaves. The branches have a constitution identical to that of a tree, and the leaves have a constitution identical to that of a node, the only difference being that no branch originates from a leaf. Each node contains a keyword, a symbol or an identifier. A leaf generally contains only one identifier. The tool (5) constructs the control graph in the form of a list, using a path algorithm from the control tree. The path algorithms of a control tree are known; essentially, they employ recursive methods. Successively traversing each control tree contained in the file (8), the tool (5) analyzes each of its branches, referring to the lexicographic and syntactical data in the file (7).

During a first pass through the control tree, each time a keyword representing a connection is encountered, a GO_TO in Fortran language being a typical but non-limiting example, the tool (5) adds the identifier which directly follows such a keyword in the control tree to a symbol table, if this identifier is not already included in the symbol table.

During a second pass through the same control tree:

Each time a keyword representing a lock application is encountered, the tool (5) adds a node NL to the list of the control graph. This node NL contains the identifier of the lock associated with the application encountered, as well as the identifier of the source program from which the control tree originates. In the control tree, the lock identifier generally directly follows the keyword representing a lock application.

Each time a symbol identifier is encountered, the tool (5) gives, as the successor to the current element of the list of the control graph, the address at which this identifier is contained in the symbol table, to which it allocates the free space head as successor. Thus it adds a node NJ to the list of the control graph.

Each time a keyword representing a conditional branching is encountered, the tool (5) gives as many successors to the current element of the list of the graph as it detects branchings. It then recursively constructs the sub-lists linked to each successor.

Each time a keyword representing a connection is encountered, the tool (5) gives, as successor to the current element of the list of the control graph, the address at which the corresponding identifier is contained in the symbol table, thus closing the control graph on a node NJ.

Each time a symbol of a variable allocation is encountered, the tool (5) adds a node NA to the list of the control graph. This node NA contains the set of arithmetical expressions linked to this allocation symbol.

Next, the tool (5) traverses the control graph, and for each node NA, it uses the data contained in the file (7) to determine the variables of the arithmetical expression whose value corresponds to a lock name. If this value does correspond to a lock name, the variable is replaced by this lock name each time it incidentally appears in the control graph. If no variable value corresponds to a lock name, the node NA is eliminated from the control graph.

It is not imperative to retain keywords, symbols or identifiers other than those described above for the construction of the control graph. The file (7) must therefore contain at least the lock identifiers linked to the acquiring of resources in the system, the keywords representing the conditional branchings, connections, function calls and lock applications, and the symbols representing the allocations of variables. The file (7) also contains the syntax linked to these elements.

In FIG. 3, the steps of the control graph, called nodes in the description below, are represented by boxes, and the transitions are represented by arrows which link the various boxes and indicate the direction of the path of the graph. This representation is not peculiar to the invention, and any other representation is also valid. Four types of nodes can essentially be seen: the branching nodes NB, the junction nodes NJ, the function call nodes NC and the nodes for applying or releasing locks NL. Other types of nodes may be found in the control graph generated from the control tree, such as, arithmetical expression nodes NA. This type of node only exists insofar as it involves a lock identifier. The branching nodes NB induce an explosion of the control graph, in that they induce branching into different son nodes as a function of logical criteria defined in these nodes. Conversely, the junction nodes NJ unite different branches of the control graph by joining, for example, the node NL containing the term "P(D)" to the node NJ containing the term "label 1" in FIG. 3. A sequence of alternating transitions and nodes is called a path; in FIG. 3 for example, the sequence of the nodes NL, NJ, NC, NB which respectively contain the terms "P(A)", "label 2", "function1" and the explosion into two son nodes on one hand, and the transitions linking the nodes NL, NJ, NC, NB on the other hand, constitute one branch of the graph in this figure. The function call nodes NC allow the branching on the control graph of the called function, and the cutover to the transition following this same node NC at the end of the control graph of the called function. The links thus established between different elementary graphs create the complete control graph for the execution of a program. The nodes for applying and releasing locks NL are those which most directly relate to the scope of the invention. Each time the execution of a process requires the sharing of a resource in the system, the development of the control graph of this process passes through a lock application step linked to this resource. The object of this is to prevent another process from simultaneously accessing the same resource, thereby inhibiting the proper usage of this resource by the first process to which it is allocated. After the utilization of this resource, the process to which it was allocated must release the applied lock in order to allow another process or a subsequent step of the same process to use this resource. In FIG. 3, for example, one sees two successive nodes NL which contain the terms "P(B)" and "L(B)" for the application of the lock B and the release of the lock B, respectively.

Finally, the tool (5) simplifies the control graph so that it possesses only the branches which contain applications and releases of locks. Thus, the function call nodes NC, when these functions do not handle any applications or releases of locks, are eliminated from the graph. The term contained in each node NC actually constitutes the identifier of the entry point into the control graph of the function called by this node. The tool (5) causes the variables manipulated by the applications and the releases of locks to correspond to global variables. It will be recalled that a variable is called global when its identifier in a sub-program is the same as it is in the main program. Likewise, the tool (5) simplifies the symbol table of each source file so that it retains only the symbols linked to the synchronization operations and to the function calls. This symbol table is kept in the file (7). The result of this operation is easier to understand in the example in FIG. 3, in which the first node NB which succeeds the node NJ containing the term "label1" will be eliminated, this node NJ having as its direct successors the node NL containing P(A) and the node NL containing P(E). Likewise, the node NC containing the term "Function1" will have as its direct successors the node NL containing the term "P(B)" and the node NL containing the term "P(C)". Following an identical procedure, the nodes NJ are also eliminated. The node NL containing the term "L(C)" will have as its direct successor the node NC containing the term "function 1", and the node NL containing the term P(D) will have as its direct successors the nodes NL containing P(A) and NL containing P(E). Each graph is terminated by a node NF which contains an end symbol, for example φ.

The tool (5) thus makes the set of all the control graphs created from the source file available to the tool (6), and does so in their simplest expression; i.e. form.

The tool (6) traverses each control graph made available by the tool (5) separately. These separate paths simulate parallel executions of the different tasks linked to each of these graphs. Not assigning any order of synchronism to these tasks a priori, creates an example of the most unfavorable case of simultaneous calls to shared resources. The advantage of the static analyzer (1) is that by preventing the blocks which result in the case of the figure, one is certain to avoid having any blocks result from the process, no matter what the sequential order of the concatenation of these tasks may be.

While traversing each control graph, the tool (6) creates and modifies a list called a mother list. It constructs this mother list in the following way. Each time a node NL containing a lock application is encountered, this lock application is added to the mother list. Each time a node NL containing a lock release is encountered, all the lock applications which exist in the mother list at that moment are kept in a daughter list. Consequently, with each new release of a lock, a new daughter list is created. Next, the lock application which corresponds to this release is eliminated from the mother list. The daughter lists are frozen, in contrast to the mother list which continually evolves in accordance with the lock applications and releases. It is interesting to note that a daughter list contains only lock applications. The set of daughter lists corresponds to the set of lists of lock applications and represents all the combinations of lock applications possible during the execution of programs.

The path through the control graph is effected by means of a recursive function called "Path". This function is applied to three global variables: the current node, the current mother list and the set of suspended mother lists. The suspended mother lists are defined in the algorithm of the "Path" function. The algorithm is the following:

- If the node is the NF type, then the current mother list is added to the set of suspended mother lists if and only if an identical mother list is not already contained in this set, and the path is terminated.
- If the node is the NB type, then the "Path" function is called for the leftmost or leading successor of the node, and is then called for the rightmost or terminating successor of the node.
- If the node is the NJ type, if a mark is assigned to this node, and if the mark of the node is equal to 2, the path is terminated; if not the mark of the node is incremented, the "Path" function is called for the successor of the node, and the mark of this node is decremented.
- If the node is the NA type, then the "Path" function is called for the successor of the node.
- If the node is the NL type, and if it contains a lock release, the mother list is copied into a new list of lock applications and the most recent lock application corresponding to the release is removed from the mother list; if not the contents of the node NL are added to the mother list and the "Path" function is called for the successor of the node.
- If the node is the NC type, then the "Path" function is called for the entry node of the graph of the function. The node NC is associated with a set called a set of the suspended lists. With each return of the called function, the mother list LM is kept in this set if it is different from the mother lists already contained in this set. The "Path" function is called for the successor of the node as many times as necessary, with each of the suspended mother lists as its current mother list.

With each entry into a new graph, the call of the "Path" function is executed with the entry node of the graph, an empty mother list and a set of empty suspended mother lists. On the other hand, each of the suspended mother lists remaining in the set of suspended mother lists after the graph is traversed is copied into a lock application list, again called a daughter list.

In re-reading the algorithm described above, it is noted that the set of suspended mother lists is increased by one new suspended mother list if the node is the NF type, that is, if the pass through the graph in question has terminated. In fact, after the pass through the graph of the system call, the suspended mother lists must be empty. If the opposite is true, this indicates that some locks were not released after the system call. This is due to an error in the programming of the source file studied by the analyzer (1) or to a noise. When the tool detects an error where there is none, this constitutes a noise. As will be seen further on, the invention proposes means for eliminating noise.

The usefulness of the set of suspended mother lists appears in the condition in which the node is the NC type. In effect, the graph of a function can be terminated by several different nodes NF which follow the conditional branchings within this function. It is therefore necessary to study the evolution of the mother list of the graph having called this function for each of the evolutions of this mother list within this function.

The mark assigned to a node of the NJ type is used to traverse, twice and only twice, the branches downstream from this node as far as their eventual wraparound on it. This makes it possible to detect the potential deadlocks in a cyclical execution of the graph. In order to understand the importance of this type of detection, it is necessary to keep in mind that the graph represents a system call function and that several processes can access this same function independently. If different processes are executed in parallel, it is possible that they concatenate the steps of a function which correspond to the nodes of the same loop of a control graph. The succession of two passes the control graph makes it possible to reveal the deadlock between two processes whose lock applications are concatenated in the order described in the loop of the control graph. Two passes are sufficient because the double application of the same lock is detected in the second pass.

As an example, apply the part of the process just described to the control graph in FIG. 3. This makes it possible to follow the evolution of the mother list LM beginning the pass through the graph at the node NJ1 containing the term "label 1", and to follow the creation of n daughter lists LF1, LF2, . . . , LFn from this mother list.

As the node is the NJ type, the mark of the node, initially nil, is incremented to 1, and the function Path(NB1,φ,φ) is called.

At the node NB1, the function Path(NL1,φ,φ) is called, and at the return of recursivity, the function Path(NL7,φ,φ) will be called, but this branch will not be developed here, as it is unnecessary to the present explanation.

At the node NL1, LM={P(A)}, and the function Path (NJ2, {P(A)},φ) is called.

At the node NJ2, the mark of the node, initially nil, is incremented to 1, and the function Path(NC1, {P(A)},φ) is called.

Figure 4:
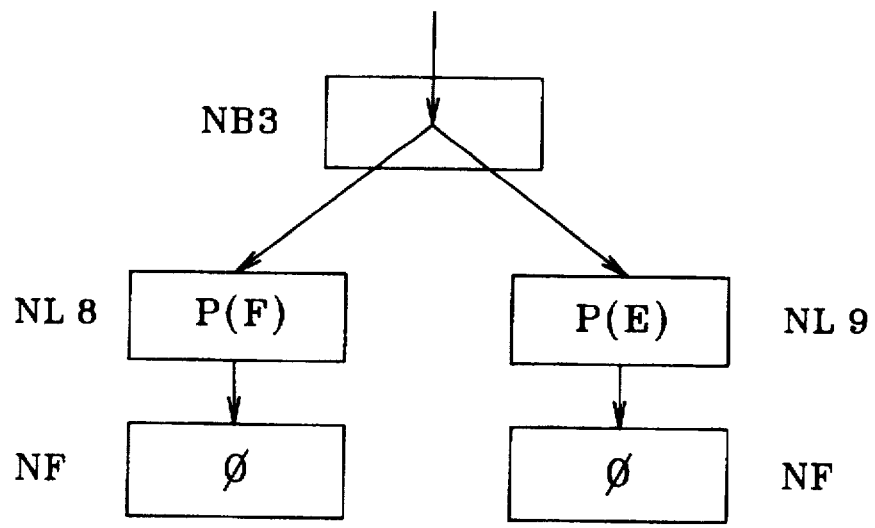

At the node NC1, if for example, Function1 constitutes a call of the graph in FIG. 4, then the function Path(NB3,{P(A)},φ) is called.

At the node NB3, the function Path(NL8,{P(A)},φ is called; at the return of recursivity, the function Path(NL9, {P(A)},φ) is called.

At the node NL8, LM={P(A), P(F)}, and the function Path(NF,{P(A),P(F)},φ) is called. The mother list {P(A),P(F)} is added to the set of suspended mother lists which up to now were empty.

Path(NF,{P(A),P(F)},{P(A),P(F)}) is terminated, and with the return of recursivity, Path(NL8,{P(A)},{P(A),P(F)} is also terminated.

At the node NL9, LM={P(A), P(E)}, and the function Path(NF,{P(A),P(E)},φ) is called. The mother list {P(A), P(E)} is added to the set of suspended mother lists which up to now were empty.

Path(NF,{P(A),P(E)}{P(A),P(E)}) is terminated and at the return of recursivity, Path(NL9,{P(A)},{P(A),P(E)} is also terminated.

Finally, the function Path(NB3,{P(A)},{P(A),P(F)}, {P(A),P(E)}}) is terminated by the return of recursivity.

Always at the node NC1, the current mother list is replaced by each of the suspended mother lists and the functions Path(NB2,{P(A),P(F)}φ) and Path(NB2,{P(A),P(E)},φ) are called.

At the node NB2, the function Path(NL2,{P(A),P(F)},φ) is called, and at the return of recursivity, the function Path(NL5,{P(A),P(F)},φ)} will then be called, but this branch will not be developed here, as it is unnecessary to the present explanation.

At the node NL2, LM={P(A),P(F),P(B)}, the function Path(NL3,{P(A),P(F),P(B)},φ) is called.

At the node NL3, which contains a lock release L(B), the daughter list LF1={P(A),P(F),P(B)} is created, LM={P(A), P(F)}, and the function Path(NL4,{P(A),P(F)},φ) is called.

At the node NL4, LM={P(A),P(F),P(D)}, and the function Path(NJ1,{P(A),P(F),P(D)},φ) is called.

At the node NJ1, the mark of the node, previously set at 1 is incremented to 2, and the function Path(NB1,{P(A),P(F), P(D)},φ) is called.

At the node NB1, the function Path(NL1,{P(A),P(F), P(D)},φ) is called, and at the return of recursivity, the function Path(NL7,{P(A),P(F),P(D)},φ) will then be called, but this branch will not be developed here, as it is unnecessary to the present explanation.

At the node NL1, LM={P(A),P(F),P(D),P(A)}, and the function Path(NJ2,{P(A),P(F),P(D),P(A)},φ) is called.

At the node NJ2, the mark of the node, previously set at 1, is incremented to 2, and the function Path(NC1,{P(A),P(F),P(D),P(A)},φ) is called.

At the node NC1, with the function 1 constituting a call of the graph in FIG. 4, the function Path(NB3,{P(A),P(F), P(D),P(A)},φ), is called. The path is identical to the path described above. Finally, one emerges from this path with the following suspended mother lists:

{P(A),P(F),P(D),P(A),P(F)} and {P(A),P(F),P(D),P(A),P(E)}.

Always at the node NC1, the current mother list is replaced by each of the suspended mother lists and the functions Path(NB2,{P(A),P(F),P(D),P(A),P(F)},φ) and Path(NB2,{P(A),P(F), P(D),P(A),P(E)},φ) are called.

At the node NB2, the function Path(NL2,{P(A),P(F),P(D), P(A),P(F)},φ) is called, and at the return of recursivity, the function Path(NL5,{P(A),P(F),P(D),P(A),P(F)},φ) will then be called, but this branch will not be developed here, as it is unnecessary to the present explanation.

At the node NL2, LM={P(A),P(F),P(D),P(A),P(F),P(B)}, the function Path(NL3,{P(A),P(F),P(D),P(A),P(F),P(B)},φ) is then called.

At the node NL3, which contains a lock release L(B), the daughter list LF2={P(A),P(F),P(D),P(A), P(F),P(B)} is created, LM={P(A),P(F),P(D),P(A),P(F)}, and the function Path(NL4,{P(A),P(F),P(D),P(A),P(F)},φ) is called.

At the node NL4, LM={P(A),P(F),P(D),P(A),P(F),P(D)}, the function Path(NJ1,{P(A),P(F),P(D),P(A),P(F),P(D)} is called.

At the node NJ1, the mark of the node, previously set to 2, the path is terminated. This causes the return of recursivity to the node NL4, then to the nodes NL3, NL2, NB2.

At the node NB2, the function Path(NL5,{P(A),P(F),P (D), P(A),P(F)}φ) is called, but as specified above, this path will not be described in detail in order to simplify the explanation. The return of recursivity proceeds to the node NC1, then to the node NC2 where the mark is then decremented to 1. The return of recursivity again proceeds to the node NL1, then to the node NB1. The call of the function Path(NL7,{P(A),P(F),P(D)}φ) at the node NB1 will not be described in detail. At the return of recursivity to the node NJ1, the mark is decremented to one. The return of recursivity then proceeds, as described above, through the nodes NL4, NL2, NB2, NC1, NJ2 where the mark is reset to zero, NL1, NB1 and finally NJ1 where the mark is reset to zero and where the first call for traversal is terminated.

One variant of the "Path" function lies in the introduction of a supplementary indicator into the execution of this function: the set of the different mother lists upstream from a node NJ. In the algorithm of the function described above, the condition in which the node is the NJ type is modified as follows:

If the node is the NJ type, and a set of the different mother lists which appeared during previous encounters of this node NJ is constituted, then if the current mother list is included in this set, the path is terminated, and the mark of the node is set at zero, if not, the current mother list is added to this set and, a mark being assigned to this node; if the mark of the node is equal to 2, the path is terminated, if not the mark of the node is incremented, the "Path" function is called as the successor of the node, and the mark of this node is decremented.

The importance of this variant is in that it makes it possible to considerably reduce the execution time of the "Path" function. In fact, each path of the control graph which ends at the node NJ in question corresponds to a current mother list. It is therefore necessary a priori to study, for each of these paths, the evolution of the mother list for the path of the control graph downstream from the node NJ. Without the variant of the algorithm of the "Path" function introduced above, if n paths of the control graph end at the node NJ, the part of the graph downstream from this node is completely and systematically traversed n times. However, with each encounter of the same node NJ, the evolution of the mother list downstream from this node is always the same. Therefore two mother lists which are identical prior to the encounter of the node NJ, produce two mother lists which are identical after this encounter. These identical mother lists will generate the same daughter lists and are therefore of no importance. If m mother lists are identical to one of the n-m mother lists previously constructed, the variant described makes it possible to reduce the number of recursive calls to the "Path" function at n-m.

The tool (6) has thus created the set of lists of lock applications possible in the execution of the source programs submitted to the static analyzer (1). These lists of locks contain, to the right of each lock application, the name of the source file at their origin. This is produced from the contents of the NL type nodes.

Every list which constitutes a truncation of the last elements on a list L, according to the order of the writing of this list, is called a prefix list of the list L. Thus the list, {P(A),P(B)} is a prefix list of the list {P(A),P(B),P(C)}, but the list {P(B),P(C)} is not one. The tool (6) reviews the set of the lock application lists and eliminates all the prefix lists of each lock application list so that a prefix list does not add any supplementary information to the order of the lock applications by the system. This makes it possible to reduce the set of lock application lists.

Figure 5:
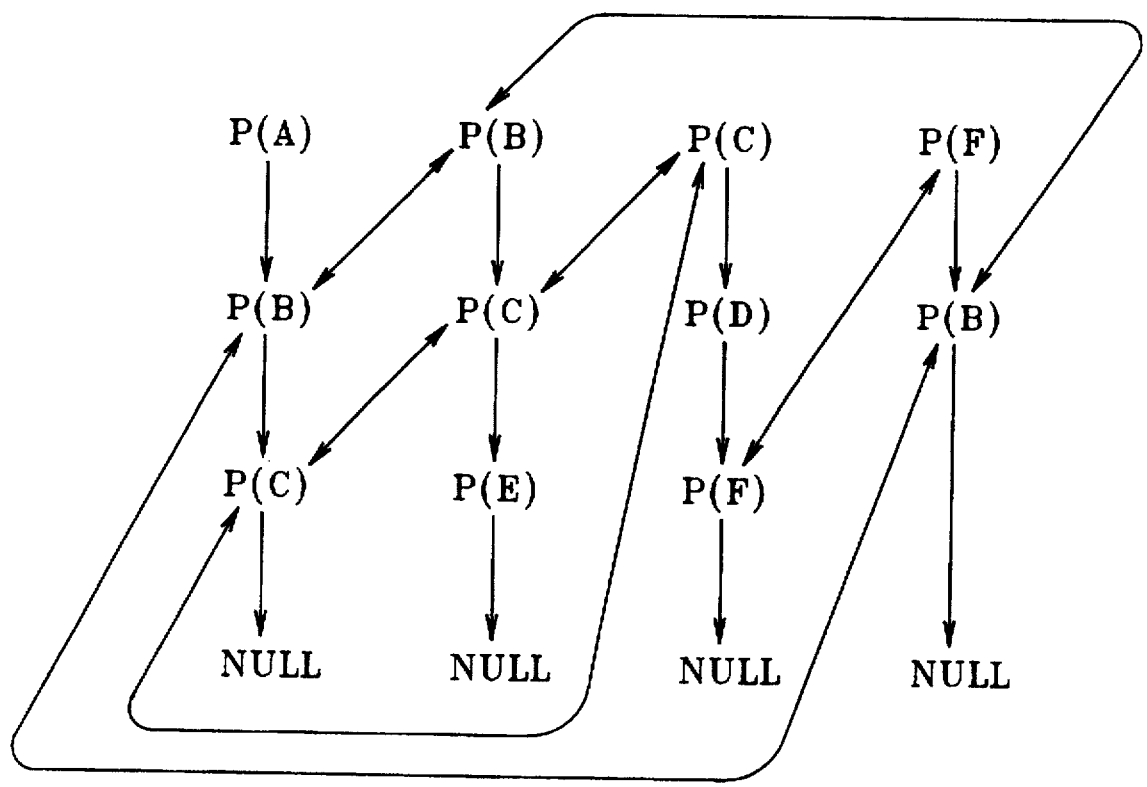
FIG. 5 represents a symbolic example of a graph of lock applications.

FIG. 5 represents a sample of a possible result furnished by the tool 6. The tool 9 links the different daughter lists to one another bi-directionally at the level of their common lock applications. This processing of the daughter lists LF is executed using the algorithm which follows.

A daughter list LF is a sequence of nodes, each of which is occupied by a lock application P(x) and the name of the source program from which this lock application originated. Moreover, a set of pointers "Double_arrow" is added into each of these nodes. For each of these nodes, the set of pointers "Double_arrow" is initialized at the empty set.

In each daughter list LF, traverse the lock applications P(x) of this list.

For each lock application P(x), traverse the lock applications P(y) in each of the other daughter lists LF. If P(y)=P(x), then, If the node occupied by P(y) is already assigned a pointer "Double_arrow" toward that occupied by P(x), pass to the lock application P(y) which follows the other daughter list, or to another new daughter list if P(y) was its last lock application.

If not, add to the set of pointers "Double_arrow" of the node occupied by P(x) a pointer toward the node occupied by P(y) and a reciprocal pointer toward the node occupied by P(x) in the set of pointers "Double_arrow" of the node occupied by P (y);

If not, to pass to a subsequent node or to a subsequent daughter list.

An example of an intermediate result, after the processing of the set of lists LF by the tool 9, is symbolically represented in FIG. 5. For instance, the lock applications P(B) of the lists LF1, LF2, and LF4 are linked by double-arrows. The lock applications P(C) of the lists LF1, LF2 and LF3 are linked by double-arrows. The lock applications P(F) of the lists LF3 and LF4 are linked by double arrows. Thus, there is a cycle which passes through P(B) and P(C) in LF2, through P(C), P(D) and P(F) in LF3 then through P(F) and P(B) in LF4, which is wrapped around P(B) in LF2. Such a cycle, in accordance with the fourth condition of Coffman et al., is a cause of deadlocking.

Figure 6:
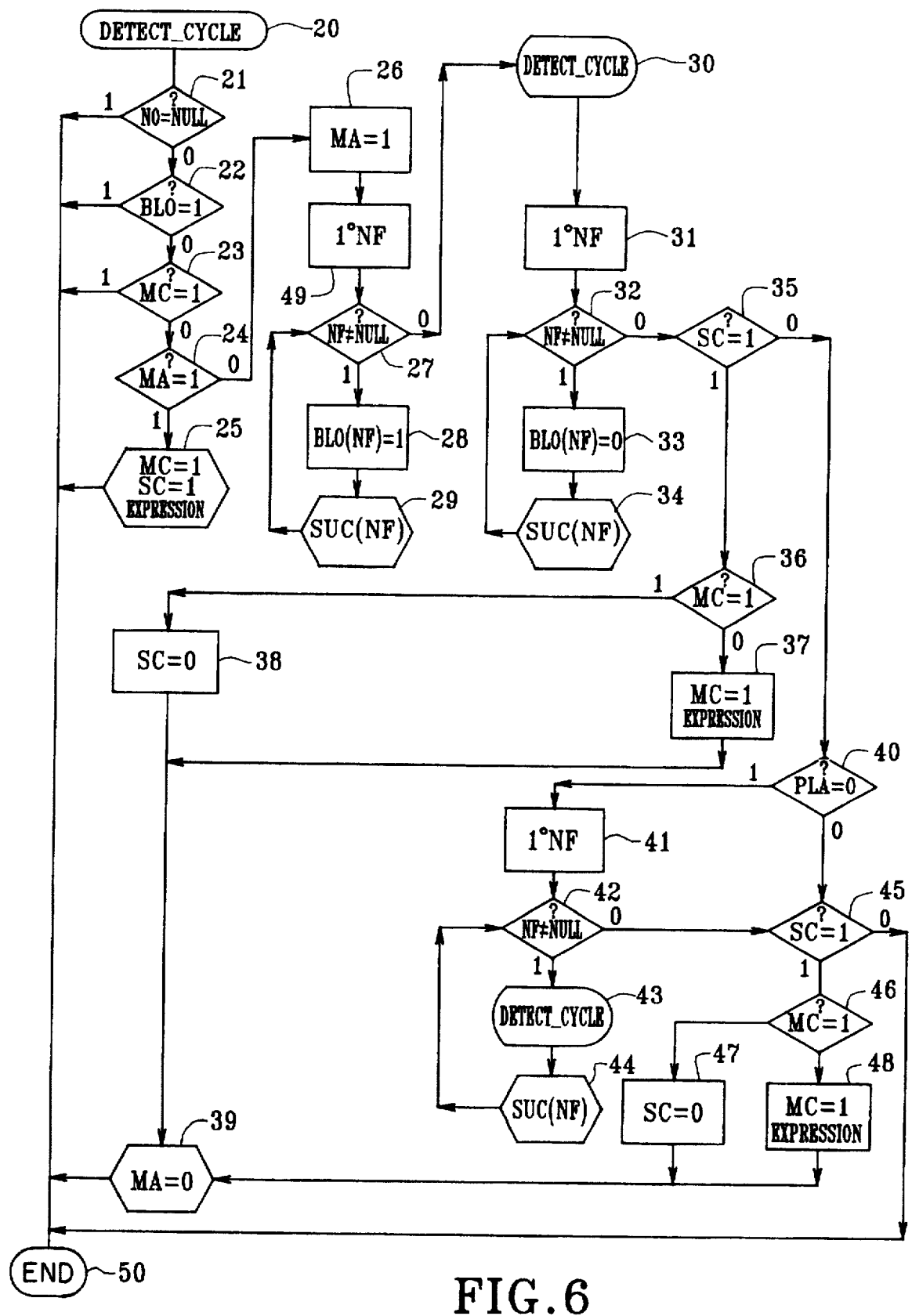
FIG. 6 represents the algorithm used by the tool (10) of the static analyzer which is the object of the invention.

The function of the tool (10) is to automatically process the result of the tool (9) in order to indicate the cycles which conform to the fourth condition of Coffman et al. In order to do this, the tool (10) uses the algorithm for which a flow chart is represented in FIG. 6.

Step (20) is the entry point into the function "Detect_cycle" whose object, as its name indicates, is to detect the cyclical sequences of lock applications P(x), which cannot verify an order relation. This function is applied to three parameters marked NO, PLA, and SC. NO designates the current node of the graph furnished by the tool (9); it is successively initialized at the first node of the first list of each of the noncontiguous sub-graphs of the graph furnished by the tool 9. A node NO is composed of several fields. A first field, in a non-limiting example, contains a lock application P(x) or the indicator marked NULL, which signifies the end of a list LF of lock applications. In the algorithm described, the contents of this field are digested at the value of the parameter NO. A second field contains a pointer, marked SUIT, toward the successor of the node in the list LF. A third field, marked SOURCE, contains the name of the source program from which the lock application P(x) originates. A fourth field contains one or more reciprocal pointers marked DF, symbolized by a double arrow in FIG. 5. PLA is a logical indicator which has a value of 1 when the current node NO of the function "Detect_cycle" results from a path downstream from a node addressed by a reciprocal pointer DF. Its value and its role will be better understood through its processing by the algorithm which will be described presently. SC is a logical indicator which has a value of 1 when a cycle of lock applications is detected. PLA and SC are initialized at the value 0.

Each node NO is assigned more than three global logical variables BLO, MC, and MA whose purpose will be better understood in the explication of the steps (22, 23, 24). These variables are initialized at 0 for all of nodes of the graph furnished by the tool (9).

Step (21) is a test of the value of the current node NO. If NO=NULL, the sequence of the algorithm is terminated.

Step (22) is a test of the value of the variable BLO assigned to the current node NO. BLO is at 1 if the node NO is blocked; the significance of a blocked node NO will be better understood in the explanation of the steps (28, 33). If BLO=1, the sequence of the algorithm is terminated.

Step (23) is a test of the value of the variable MC assigned to the current node NO. MC is at 1 if the node NO is marked as belonging to a cycle; the condition in which a node NO belongs to a cycle will be better understood in the explanation of the steps (25, 37, 48). IF MC=1, the sequence of the algorithm is terminated.

Step (24) is a test of the value of the variable MA assigned to the current node NO. MA is at 1 if the current node NO has been previously scanned by the function "Detect_cycle." This signifies that the node NO is being scanned for the second time by the function "Detect_cycle", which translates into a wraparound in the path of the graph furnished by the tool (9). That is why, if MA=1, the variables MC and SC of the node NO are set at 1 in step (25) to indicate, respectively, that the node NO belongs to a cycle and that a cycle has been detected; in this case, the sequence of the algorithm is terminated. MA is at 0 if the node NO is being scanned for the first time. MA is then set at 1 in step (26) to indicated that it has been scanned.

In step (49), two continuations of paths following the function "Detect_cycle" are successively envisaged. The first one corresponds to a continuation toward the nodes of the graph which succeed the current node NO in the same list LF, which corresponds to the recursive call of the function "Detect_cycle" in step (30). The second one corresponds to a continuation toward the first node NF of the NO type, addressed by the first pointer DF of the current node NO, which corresponds to the recursive call of the function "Detect_cycle" in step (43). Each of the continuations of paths corresponds respectively to the case in which the lock application P(x) of the current node would first be effected by the process at the origin of this lock application in the list of the current node NO, and to the case in which the lock application P(x) of the current node would first be effected by the process at the origin of this lock application in the appended list in which the node NF is located. These two cases being exclusive of one another, no lock application will be effective downstream from the node which is not retained. That is why, in step (49), the first node NF addressed by a pointer DF contained in the node NO is considered. Note that in this case DF addresses the value NULL if there is no double arrow from the current node NO.

The steps (27, 28, 29) correspond to the case in which the path does not proceed through the list appended downstream from the first node NF; they represent the following sequence. Although NF is different from NULL, that is to say that there is a successor node NF in the list downstream from the first node NF, the steps (28, 29) are executed. In step (28), the variable BLO assigned to the node NF is set at 1 to indicate that the lock application of this node cannot be effective. Step (29) positions the node NF on its successor. At the end of the sequence, the recursive function "Detect_cycle" is called for the successor of the current node NO with the current values of the parameters PLA and SC in step (30). These steps constitute a first loop (27, 28, 29) which masks all the successors of the node NF in the same list, before the recursive call of the function "Detect_cycle" for the successor of the node NO, in a step (30).

Following step (30), at the return of recursivity of the function "Detect_cycle," the lock applications downstream from the node NF can again be effective. This is translated by the sequence of the steps (32, 33, 34,) which are dyads of the steps (27, 28, 29). These steps constitute a second loop (32, 33, 34) which unmasks all the successors of the node NF in the same list, after the recursive call of the function "Detect_cycle" for the successor of the node NO, in step (30).

In order to better understand the finality of the steps (27, 28, 29) and (32, 33, 34), look at their action in the example of the lists in FIG. 5. In the first list on the left, locate the node NO which contains P(B). In step (49), the first pointer "Double_arrow" which the tool 9 has added to this node NO defines the node NF in the second list from the left in FIG. 5, this node NF also containing P(B). The steps (27, 28, 29) then set at 1 the variable BLO of the node NF containing P(B) and of each of the nodes NF downstream from it down to the end of the list, namely the nodes containing P(C) and P(E). But, in step (22), the function "Detect_cycle" effects a return of recursivity in a node whose variable BLO is set at one. Thus, when the function "Detect_cycle" is called in step (30) for the successor of the node NO of the first list on the left containing P(B), that is, for the node NO containing P(C) in the first list on the left, then the node containing P(C) and its successors in the second list from the left will not be taken into consideration in the subsequent recursive calls of the function "Detect_cycle". This is interpreted in the following way. If the process at the origin of the list {P(A),P(B),P(C)} effects the lock application P(B), the process at the origin of the list {P(B),P(C),P(E)} will be in a wait state for P(B) and thus will not effect the lock application P(C) and the subsequent ones. It is therefore not necessary to consider these lock applications. After having traversed the sequence of the first list on the left in step (30), the variable BLO is reset at zero in the steps (32, 33, 34) to make it possible to traverse the list {P(B),P(C),P(E)} during other calls of the function "Detect_cycle."

Step (35) poses the question of whether in the first path continuation, a cycle was detected downstream from the current node NO. If this is the case, that is to say if SC=1, the next question posed is whether this cycle is wrapped around at the level of the current node NO, in which case the nodes upstream from the current node NO do not belong to this cycle and the cycle detection signal SC must be reset to zero upon the return of recursivity of the function. The answer to this last question is supplied by the steps (36, 37, 38).

In step (36), if MC=1, it is in the current node NO that the cycle was detected for the continuations of paths downstream, and thus SC is set at zero in step (38). If MC≠1, it is not in the current node NO that the cycle was detected for the continuations of paths downstream; it is therefore for a node which is upstream from the node NO and the signal SC must be kept at its previous value. On the other hand, the node NO belongs to a cycle; that is why MC is set at one in step (37). Before the return of recursivity in step (50), MA is set at zero in step (39) because the previous passages through the node NO allowed a cycle to be detected. Any subsequent passage on the node NO will thus belong to another cycle.

If, in step (35), SC=0, no cycle has been detected for the first path continuation resulting from the steps (27) through (35). The question to be posed is whether a cycle exists in the path continuation through an appended list. The answer to this question is supplied by the steps (40) and (48).

In step (40), if NO is already part of the path of an appended list, that is to say if PLA=1, then it is useless to traverse a second appended list. That is why, if PLA≠0, step (45) is executed directly.

Step (45) poses the question of whether in the first path continuation, a cycle has been detected downstream from the current node NO. If this is the case, that is to say, if SC=1, the next question to be posed is whether this cycle is wrapped around at the level of the current node NO, in which case the nodes upstream from the current node NO do not belong to this cycle and the cycle detection signal SC must be reset to 0 upon the return of recursivity of the function. The answer to this last question is supplied by the steps (46, 48, 47).

In step (46), if MC=1, it is in the current node NO that the cycle has been detected for the downstream path continuations, and thus SC is set at zero in step (47). If MC≠1, it is not in the current node NO that the cycle has been detected for the downstream path continuations; it is therefore for a node which is upstream from the node NO and the signal SC must be kept at its previous value. On the other hand, the node NO belongs to a cycle; that is why MC is set at 1 in step (48). Before the return of recursivity in step (50), MA is set at 0 in step (39) because the previous passages through the node NO allowed a cycle to be detected. Any subsequent passage on the node NO will therefore belong to another cycle.

In step (40), if PLA=0, NO is not the NF type, and it is therefore of interest to locate the node addressed by the first pointer DF of the node NO in order to obtain a node named NF. The steps (42, 43, 44) describe the following sequence which interprets the path of an appended list downstream from the first node NF.

In step (42), although NF≠NULL, execute the steps (43, 44) and exit toward step (45) at the end of the sequence.

Step (43) calls the recursive function "Detect_cycle" with NF as the value of the node, and with 1 as the value of PLA and the previous value of SC.

In step (44), give NF the value of its successor in the list of lock applications to which it belongs.

If no cycle is detected in step (45), the return of recursivity is effected in step (50).

In the thread of the algorithm described previously, each time the variable MC is set at 1, that is to say in the steps (25, 37, 48) the contents of the first and third fields of the node in process is sent to an expression file. The expression file is, in non-limiting examples, a screen display file or a printing file.

With the detection of a risk of deadlocking, the static analyzer writes on an operator interface the lists of lock applications involved by indicating the names of the source programs to the right of the lock applications. This makes it possible for the programmer to modify the source programs so as to eliminate the risk of deadlocking detected by the static analyzer. In the example of the detection of a deadlock by the lock applications P(D) and P(F) in the lists LF13 and LF14 mentioned above, the static analyzer sends the following message:

P(C)→P(D)→P(F);P(D)∈ S3,P(F)∈ S5

P(F)→P(B)→P(D);P(F)∈ S4,P(D)∈ S5

APPENDIX

Path Algorithm
Path (node, mother list, suspended mother list)
{
    If (node==NULL) then
       {Add the current mother list to the set of suspended mother lists;
       End of path;
    }
    To test the type of the node
    Case in which node is an ND_BRANCH type:
    {
       Path (node→ left, mother list, suspended mother list);
       Path (node→ right, mother list, suspended mother list);
    }
    Case in which the node is an ND_JOIN type:
    {
       If (node→mark==2) then
          End of path;
       if not
       {
          node→mark++;
          Path (node→sequence, mother list, suspended mother lists;
          node→mark - -;
       }
    }
    Case in which the node is an ND_ASSIGN type:
    {
       Path (node→sequence, mother list; suspended mother lists);
    {
    Case in which the node is an ND_LOCK type:
    }
    If 'lock release' then
       Copy mother list into a new list of lock applications;
    Update of the mother list;
    Path (node→sequence, mother list, suspended mother lists);
    }
    Case in which the node is an ND_CALL type:
    {
       Path (node→function, mother list, suspended mother lists of the function);
       For each suspended list of the function, execute
       {
          Path (node→sequence, suspended mother list of the function, suspended mother lists);
       }
    }
}
At the first node of the graph, the function will be called as follows:
- mother list = NULL;
- suspended mother list = NULL
- Path (first node of the graph, mother list, suspended mother list);
- add the mother lists from the set of suspended mother lists to the list of lock applications.

We claim:

1. A static analyzer (1) for analyzing risks of a blocking operation in a multiprocessor system having shared memory, said analyzer being operable to receive, as an input, programming files (2) of the system containing system call functions and nomenclature (3) of primitive functions for applying and releasing locks in the system, and further wherein said analyzer produces messages (4) which enable elimination of deadlocking before the system is started up, said analyzer comprising a first tool (5) for producing a control graph for each system call function contained in the programming files (2), wherein said control graph includes only the nomenclature (3) of the primitive functions using resources of the system, and a second tool (6) which generates lists of lock applications (LM) for all possible synchronizations of different processes in the system.

2. The static analyzer according to claim 1, wherein the second tool (6) includes means for using a path algorithm based on the graphs produced by the first tool (5), said algorithm calling a recursive path function applied to at least two parameters, one parameter being a current node of a graph being traversed, and another parameter being a list (LM) of locks applied and not released for nodes of a graph traversed previously, and further including means for storing the list (LM), as the list existed before said current node was encountered, in a frozen list (LF) each time a node containing a lock release is encountered.

3. The static analyzer according to claim 2, wherein a node (NJ) contains said lists (LM) generated by the path function in previous passes through said node, and further wherein said path function effects a return of recursivity if a current list (LM) is the same as a stored list (LM).

4. The static analyzer according to claim 3, wherein each node (NL) which contains a lock application also contains a name of a source program from which said lock application originated.

5. The static analyzer according to claim 2, wherein each node (NL) which contains a lock application also contains a name of a source program from which said lock application originated.

6. The static analyzer according to claim 2, further including a third tool (9) which generates a graph of lock applications while linking, using a reciprocal pointer (DF), at least two elements in the frozen lists (LF) produced by the second tool (6) containing a same lock application.

7. The static analyzer according to claim 6, wherein each node (NL) which contains a lock application also contains a name of a source program from which said lock application originated.

8. The static analyzer according to claim 6, further including a fourth tool (10) which edits cycles of the graph of lock applications produced by said third tool (9) using a recursive detect-cycle function, the detect-cycle function being applied to at least two parameters (NO and SC), a first parameter (NO) being a node of the graph produced by the third tool (9) and a second parameter (SC) being an indicator which signals each time during recursive execution that the detect-cycle function is re-executed by the same node (NO).

9. The static analyzer according to claim 8, wherein each node (NL) which contains a lock application also contains a name of a source program from which said lock application originated.

10. The static analyzer according to claim 8, wherein the detect-cycle function includes:

a defining step (49) which defines a node (NF) as a first node addressed by the reciprocal pointer (DF) contained in said node (NO), a first loop (27, 28, 29) which masks all successors of the node (NF) in the same list, before the recursive call of the detect-cycle function for the successor of the node (NO), a second loop (32, 33, 34) which unmasks all the successors of the node (NF) in the same list, after the recursive call of the detect-cycle function for the successor of the node (NO), and a calling step (43) for recursively calling the detect-cycle function for the node (NF).

11. The static analyzer according to claim 10, wherein each node (NL) which contains a lock application also contains a name of a source program from which said lock application originated.

12. The static analyzer according to claim 8, wherein the recursive detect-cycle function is applied to more than one parameter (PLA) indicating whether a current execution of the detect-cycle function is applied to more than one frozen list (LF) such as that furnished by the first tool (5) to the third tool (9).

13. The static analyzer according to claim 12, wherein each node (NL) which contains a lock application also contains a name of a source program from which said lock application originated.

* * * * *